C. F. BROWN.
Breech Loading Cannon.
No. 3,211. Reissued Nov. 24, 1868.
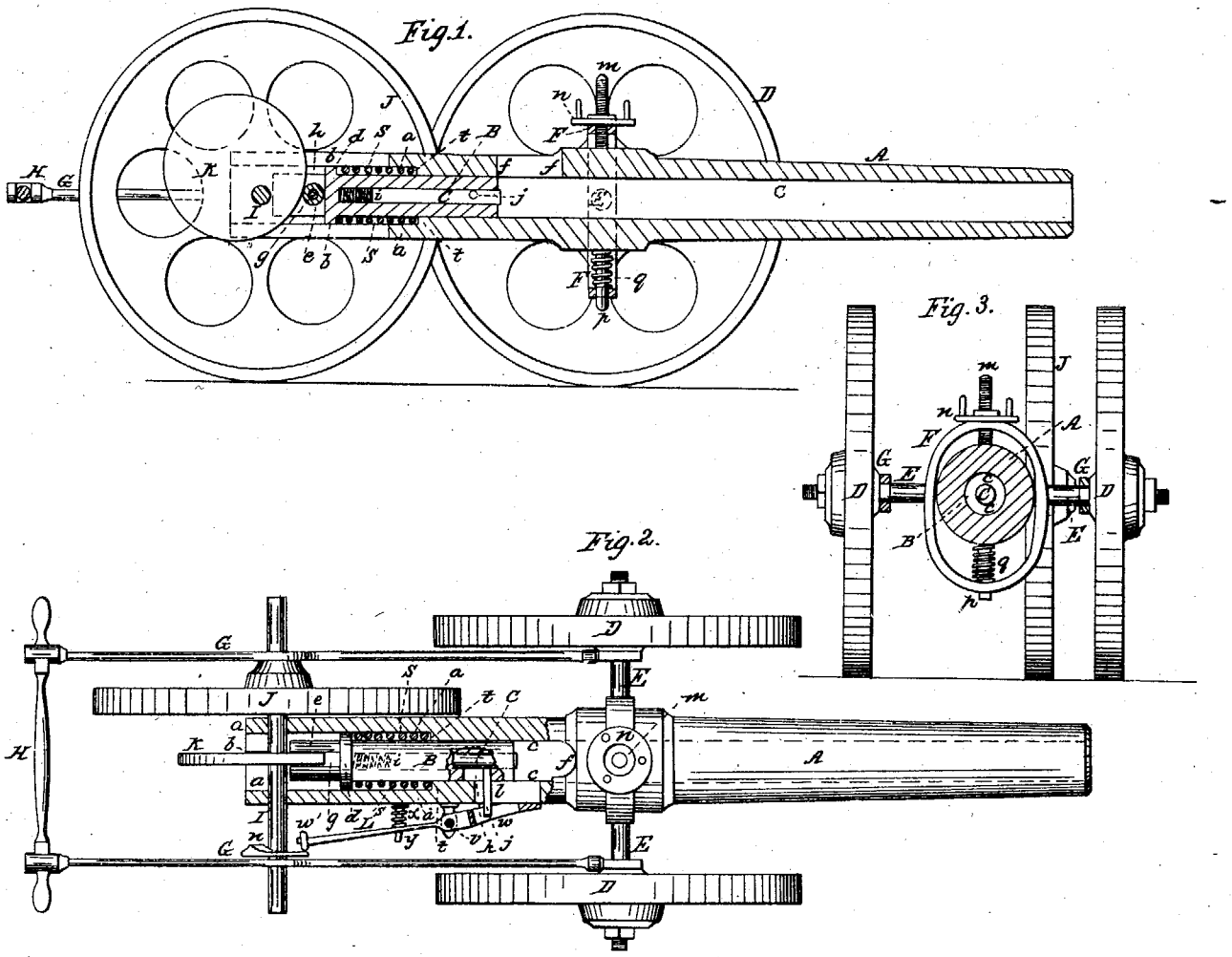
Witnesses:
R. S. Spencer
J. W. Coombs
Inventor:
C. F. Brown
per Munn & Co
Attorneys

UNITED STATES PATENT OFFICE.

CHARLES F. BROWN, OF WARREN, RHODE ISLAND.

IMPROVEMENT IN BREECH-LOADING CANNON.

Specification forming part of Letters Patent No. 30,045, dated September 18, 1860; Reissue No. 3,211, dated November 24, 1868.

*To all whom it may concern:*

Be it known that I, CHARLES F. BROWN, of Warren, in the county of Bristol and State of Rhode Island, have invented certain new and useful Improvements in Breech-Loading Ordnance; and I do hereby declare that the following is a full, clear, and exact description of the same, reference being had to the accompanying drawings, forming part of this specification, in which—

Figure 1 is a longitudinal vertical section of a light field-piece with my improvements. Fig. 2 is a plan of the same. Fig. 3 is a transverse section of the same.

Similar letters of reference indicate corresponding parts in the several figures.

The object of my invention is to facilitate the discharge of a breech-loading gun, as well as to enable a piece of breech-loading ordnance to be fired repeatedly by the act of its being drawn over the ground, so that it may be made very effective in advancing to meet or pursue or in retiring from before an enemy; also, to cause the automatic discharge of the charge by the same motive power which locates the same in the barrel of the gun.

The invention consists, chiefly, in the use of a hollow reciprocating plunger or breech-pin arranged in the breech end of the barrel, said plunger carrying within its longitudinal bore another sliding discharge-plunger. The hollow plunger locates the cartridge in the barrel. When the same has arrived at the proper place, the inner plunger is released by the action of a cam, and is forced against the charge, so as by percussion to ignite the same.

The invention also consists in mounting an eccentric for moving the hollow plunger on a transverse shaft that has its bearings in the breech end of the gun, and in mounting on the same shaft a cam which, during its revolution, operates a lever by which the inner plunger is held back, causing this lever to release the inner plunger as soon as the cartridge has been located. Thus by the same motion which locates the cartridge the same is also discharged.

The invention finally consists in connecting the aforesaid driving-shaft with one of the wheels of the gun-carriage in such manner that it is rotated by the revolution of the wheel, so that when the carriage is moved backward or forward the gun may be automatically loaded and discharged.

To enable others skilled in the art to make and use my invention, I will proceed to describe its construction and operation.

A represents the gun, having its bore continued right through the breech, and counterbored from the breech of a size larger than the regular bore *c c*, as shown at *a a* in Figs. 1 and 2, and having a narrow slot, *b b*, cut vertically through the counterbored portion. The counterbore is, however, not essential, and may be omitted. Some distance in front of the counterbore *a a* there is an aperture, *f f*, in the top of the gun for the admission of the cartridges.

B is the hollow plunger-like sliding breech-pin, fitted to work snugly but easily within the rear portion of the bore *c c*, and having near its rear end a flange, *d d*, which fits easily but snugly to the counterbore *a a*, if such counterbore is used, and in rear of this flange a slot, *e e*, extending to its rear end, said slot being of the same width as the slot *b b*. In the front portion of this slot *e e* there is arranged a roller, *g*, which is fitted to turn freely on a fixed pin or axle, *h*, inserted transversely through the breech-pin or across the said slot. This breech-pin B is also bored from the front end nearly through to receive the sliding cylinder pin or plunger C, which constitutes the hammer; and in the rear portion of the said bore there is placed, behind the said plunger C, a spiral spring, *i*, which serves to drive the said plunger forward to effect the explosion of the cartridges, which are intended to contain in their rear ends a portion of fulminating compound to be exploded by the blow of the said plunger or hammer. From one side of the said sliding plunger C there projects a pin, *j*, which passes through a slot, K, in the side of the breech-pin, and a slot, *b*, in the side of the gun.

S is a spiral spring coiled round the breech-pin B, within the counterbore *a a*, between the flange *d* of the breech-pin and the shoulder *t*, that is formed at the front of the counterbore, and exerting a constant tendency to force back the breech-pin by its pressure against the flange.

D D are the main wheels of the gun-carriage, fitted to axles E E, which are forged in the same piece with or otherwise firmly secured to the sides of a frame, F, of elliptical or other form, through which the gun passes. The gun is secured to this frame by means of a screw, *m*, which is attached to the top of the gun, and stands up therefrom perpendicular to the bore, and a nut, *n*, fitted to the said screw, the said screw passing freely through a hole in the top of the said frame, and the said nut being fitted to the said screw above the said frame, and resting on the top thereof. To the under side of the gun, opposite to and in line with the said screw *m*, there is secured a pin, *p*, which passes freely through a hole in the bottom of the frame F, and between the frame and the gun there is coiled around the said pin *p* a spiral spring, *q*.

G G H is a frame having the front ends of its parallel sides fitted loosely to the axles E E inside of the wheels D D, and having handles *r r* at its rear end, by which the gun may be laid hold of by men to push or draw it. The gun may, however, be hung in any other suitable manner in the carriage.

I is a shaft fitted to bearings in the sides G G H, and passing transversely through the slotted rear portion of the gun, or otherwise, having its bearings in the breech end of the gun.

J is a wheel of the same size as D D, or thereabout, secured to the shaft I, close to one side of the gun. This wheel J and the wheels D D support the gun and the frames F and G G H and axles E E, and they all constitute the carriage, and in running over the ground the wheels all revolve, and the revolution of the wheel J causes the shaft I to revolve in its bearings in the frame G G H. However, the shaft I may be entirely disconnected from the wheel J, and the wheel J may also be left off. The said shaft I has secured to it an eccentric, K, which works in the slots *b* and *e* of the gun and breech-pin, and in contact with whose periphery the roller *g* in the slot *e* of the breech-pin is held by the back-pressure of the spring S on the breech-pin, the said eccentric serving by its revolution to drive forward the breech-pin beyond the aperture *f f* to close the breech for firing, and the said spring to force it back behind the said aperture *f f* to permit the insertion of the cartridge through the said aperture. The pin B may be connected in any other suitable manner with the eccentric K, so as to be moved back and forth by the same, in which case the spring S and roller *g h'* may be entirely dispensed with. The said shaft I has also secured to it a laterally-operating cam, *u*, to operate on a roller, *w'*, on the rear end of a lever, L, which works on a fulcrum-pin, *v*, attached to one side of the gun, and which has in front of the said fulcrum-pin a slot, *w*, in which is received the pin *j*, that is attached to the firing-plunger C. Behind the fulcrum-pin *v* there is applied, between the gun and the lever L, a spiral or other spring, *x*, which is kept in place by a pin, *y*, said spring serving to press out the rear portion of the lever toward the cam K and keep the slot *w* in the pin *j*. Instead of this arrangement, there may be a pin formed on the lever L, working through a slot in the barrel and breech-pin directly into the plunger. In this case the pin *j* would form part of the lever L, and the slot *w* would become superfluous.

The operation is as follows: As the gun, when it has been brought to the proper elevation, is moved from place to place, the revolution of the shaft I with the wheel J causes the eccentric K by its revolution to drive forward the breech-pin B beyond the aperture *f f* and close the breech once during every revolution of the shaft; but the said pin is driven or drawn back by the spring S, or otherwise, as the eccentric recedes. In each revolution the aperture *f f* is opened to permit the insertion of a cartridge. As the breech-pin B advances, the plunger C moves with it for a certain distance, its pin *g* being held in contact with the front end of the slot K in the breech-pin, but at a certain point in the advance of the breech-pin the pin *j* comes in contact with the front end of the slot *w* in the lever L, and is thereby arrested during the continued advance of the breech-pin, causing its spring *i* to be compressed by such continued advance, or otherwise the plunger is arrested by the lever. Just as the breech-pin completes its advance, and after it has closed the aperture *f f*, the cam *u*, which up to this point has left the lever L stationary during the advance of the breech-pin, forces the rear end of the said lever laterally toward the gun, and so causes its front part to move outward far enough to liberate the plunger C, which, under the uncontrolled influence of the spring *i*, is suddenly driven forward in the breech-pin with great force so far that its front extremity protrudes through the front of the breech-pin, thereby exploding the charge. As the breech-pin recedes again, the plunger C comes back with it, and the pin *j*, coming back with them, arrives opposite the slot *w* before the cam *u* permits the lever L to be moved back by the spring *x* far enough to interfere with it, so that when the said lever arrives at the first-mentioned position (represented in Fig. 2) the said pin will be in a condition to be again arrested by the said lever the next time the breech-pin moves forward. The inner face of the front end of the lever may, however, be so beveled that the pin *j* in moving back may pass it independently of the action of the cam *u*. In advancing toward an enemy, or in retreating, the same action of the breech-pin and firing-plunger C is produced, and one of the men attending the gun has in readiness a ball-cartridge to drop into the aperture *f f* every time the breech-pin is drawn back; and as the breech-pin advances the said cartridge is pushed forward beyond the said aperture, and after the said aperture has been closed by the breech-pin the plunger C, being liberated from the lever L, as above described, and driven forward by the spring *i*, effects the explosion of the charge in the cartridge and causes the ball to be discharged. In this way a rapidly-repeated fire is kept up so long as cartridges are supplied on the withdrawal of the breech-pin beyond the aperture *f f*. If the shaft I is not connected with a wheel of the carriage, it may have a crank, so as to be turned by hand.

Instead of supplying the cartridges one by one to the aperture *f f* by hand, as above described, a number of cartridges may be arranged one above another in an upright fixed magazine above the said aperture, and they will drop into and through the said aperture one by one, as the said aperture is opened by the retreat of the breech-pin during each revolution of the shaft I. The same rapid repetition of the fire may be effected while the gun is stationary by raising the rear end of the carriage high enough for the wheel J to clear the ground, and applying a crank to one or to each end of the shaft I to give it and the cam K a rotary motion.

Having thus described my invention, what I claim as new, and desire to secure by Letters Patent, is—

1. Exploding the cartridge of a breech-loading fire-arm by means of a reciprocating plunger held within the hollow breech-pin, said plunger being detained by means of a lever, released by means of a cam actuating said lever, and forced forward by means of a spring held in the breech-pin, substantially as set forth.

2. Locating and exploding a cartridge in a breech-loading fire-arm by the action of one rotating shaft, I, and by means of an eccentric, K, and cam *u*, mounted on said shaft, substantially as specified, the shaft being arranged transversely through the body of the gun, as set forth.

3. The arrangement and combination with each other of the barrel A, breech-pin B, plunger C, spring *i*, lever L, cam *u*, eccentric K, and shaft I, all made and operating substantially as herein shown and described.

4. The wheel J, applied in combination with the eccentric K or its equivalent, for the purpose of producing the rotation of said eccentric to effect the firing of the ordnance during the motion of the gun-carriage, as specified.

CHARLES F. BROWN.

Witnesses:

FRANK BLOCKLEY,

ALEX. F. ROBERTS.